(12) United States Patent
Hawes et al.

(10) Patent No.: US 8,488,172 B2
(45) Date of Patent: Jul. 16, 2013

(54) COLLAPSIBLE BREADCRUMBS FOR MAXIMIZING SPACE IN A USER INTERFACE

(75) Inventors: Michael Kerrigan Hawes, Pittsford, NY (US); Anna Lynn Voss, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 387 days.

(21) Appl. No.: 13/018,950

(22) Filed: Feb. 1, 2011

(65) Prior Publication Data
US 2012/0194855 A1    Aug. 2, 2012

(51) Int. Cl.
*G06F 3/12*    (2006.01)
*H04N 1/40*    (2006.01)

(52) U.S. Cl.
USPC .......................................... 358/1.15; 358/1.1

(58) Field of Classification Search
USPC .............. 358/1.1, 1.13, 1.14, 1.15, 1.18, 468, 358/473; 707/100, 102; 709/203; 345/473; 715/234, 240, 513, 768, 772, 853, 854
See application file for complete search history.

(56) References Cited

U.S. PATENT DOCUMENTS

| | | | |
|---|---|---|---|
| 6,917,437 B1 * | 7/2005 | Myers et al. | 358/1.15 |
| 7,818,683 B2 * | 10/2010 | Sorin et al. | 715/768 |
| 8,010,910 B2 * | 8/2011 | Wright et al. | 715/854 |
| 8,312,386 B2 * | 11/2012 | Arakane | 715/784 |
| 2007/0180361 A1 * | 8/2007 | Dovin et al. | 715/513 |
| 2010/0281360 A1 * | 11/2010 | Arakane et al. | 715/244 |

* cited by examiner

*Primary Examiner* — Gabriel Garcia
(74) *Attorney, Agent, or Firm* — Fay Sharpe LLP

(57) ABSTRACT

Apparatus and method for maximizing space in a user interface that is displayed to a user. A breadcrumb view area having a breadcrumb view pathway with active links is concealed from view and presented based on input provided in the user interface.

15 Claims, 4 Drawing Sheets

COLLAPSIBLE BREADCRUMBS FOR MAXIMIZING SPACE IN A USER INTERFACE

BACKGROUND

The exemplary embodiment relates to fields of image processing. It finds particular application in connection with the provision of a user interface for breadcrumbs. More particularly, this disclosure relates to a system and method for displaying a breadcrumb path.

A breadcrumb pathway can be presented to a user in order to effectively present information to an audience. Breadcrumbs are a useful secondary navigation system for creating HyperText Markup Language (HTML) web pages or other type web pages. These pieces of linked text provide a method for visitors to use when journeying through a website and keeping track of where they are. These needs are often provided by services within economies that have global spans and diverse demographics, which desire efficient means for receiving workflow requests and targeting specific markets.

In one example, print industries have moved towards technical standards, such as Job Definition Format (JDF) to facilitate cross-vendor workflow implementations. JDF, for example, is an XML format about job tickets, message descriptions, and message interchanges. The initial focus was on sheet-fed offsets and digital print workflow, but has been expanded to web roll-fed systems, newspaper workflows, packaging and label workflows. JDF is an extensible format, which defines both JDF files and a job messaging format based on XML over HTTP.

As is typical of workflow systems, the JDF message contains information that enables each "node" to determine what files it needs as input and where they are found, and what processes it should perform. It then modifies the JDF job ticket to describe what it has done, and examines the JDF ticket to determine where the message and accompanying files should be sent next. A goal of workflow systems, such as with the JDF format, is to encompass the whole life cycle of a print and cross-media job, including device automation, management data collection and job-floor mechanical production process, including even such things as bindery, assembly of finished products on pallets. To realize such a globalization across media provider industries, more vendors are adopting such standards. As such, the standards themselves need to be easily manageable for acceptance.

One area of development is in the user interface displaying breadcrumb pathways to a user. For example, when a workflow is produced, presented to a client generating the workflow request, and sent for production, breadcrumb pathways can be a burden when too much user work space is taken up by long breadcrumb pathways. A need is present therefore to present breadcrumb pathways in an efficient manner so as to facilitate the workflow request efficiently and effectively in a manner that is intuitive and not cumbersome.

BRIEF DESCRIPTION

A user interface system and methods are disclosed herein to provide an indicator signifying a breadcrumb view area. The breadcrumb view area includes a breadcrumb pathway with active links for enabling and showing navigation through various folder, files, sub-folders, containers, data items, etc.

In one embodiment, as a user provides input, for example, a click on the indicator or icon, a breadcrumb view area is collapsed with all the bread crumbs. The entire area is hidden from view and when selected again, the area opens up or become visibly presented.

In another embodiment, a method is disclosed for a user interface of a computer system to enable a breadcrumb pathway in a user display. One or more inputs are received at the user interface system to hide a breadcrumb view area having a breadcrumb pathway in the user display. An indicator control is displayed that signifies a breadcrumb view area that is hidden from view of a user within the user display by the processor. Upon receiving one or more second inputs at the user display, the breadcrumb view area is presented in the user display and a breadcrumb pathway therein. The breadcrumb pathway includes one or more active links in a hierarchical structure to content navigated from by the user.

In another embodiment, a method for a user interface system in an imaging device system having toner for generating images on a medium to enable a breadcrumb pathway in a user display is executed via a processor with a memory storing executable instructions for the method. An indicator is displayed that signifies a breadcrumb view area is hidden from view of a user within the user display by the processor in the imaging device system. Upon receiving a first input at the user display, the breadcrumb view area is presented in the user display and a breadcrumb pathway therein.

DETAILED DESCRIPTION

Figure 1:
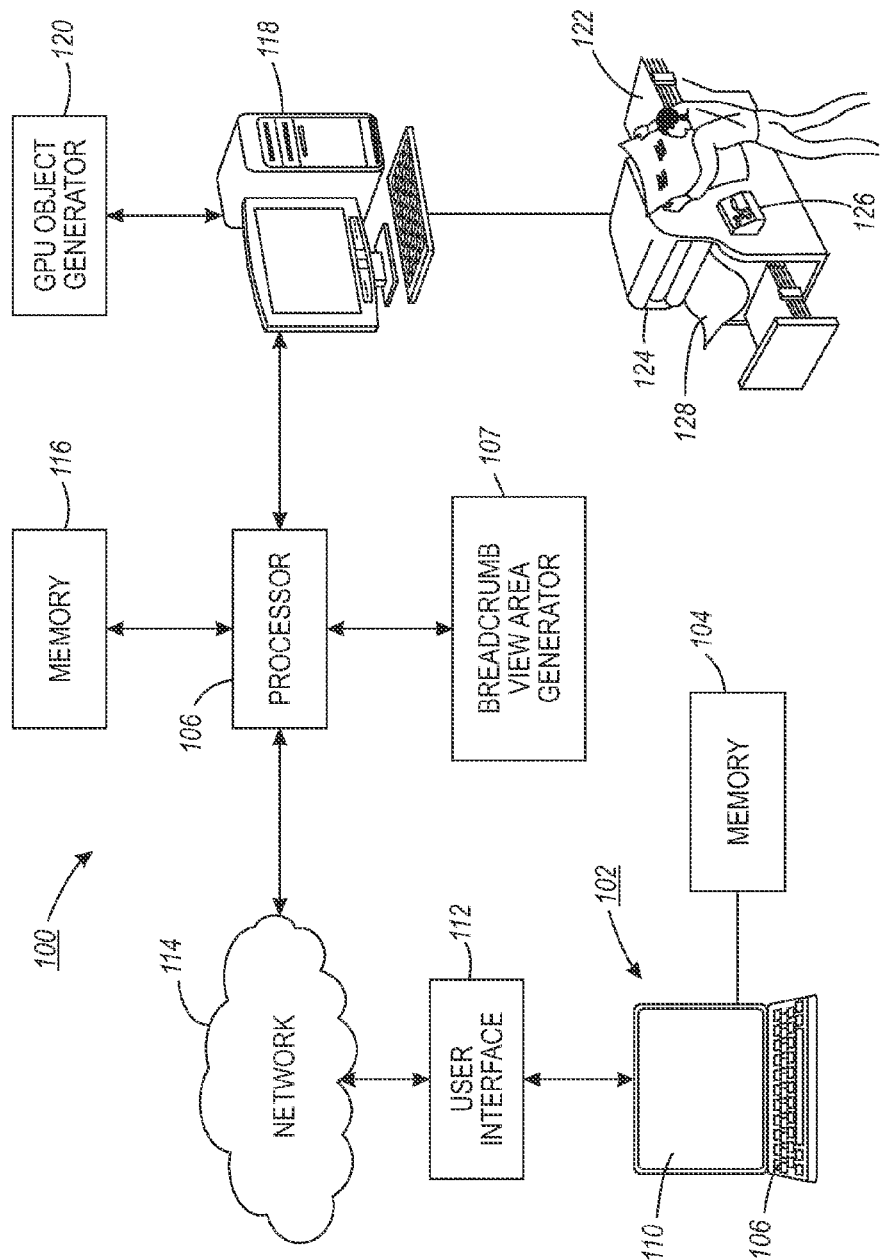
FIG. 1 is a schematic representation of an exemplary imaging device system.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

More efficient methods and/or systems for representing client file structures in hierarchical lists, such as with breadcrumbs would provide better utilization of work space and improved controls in user interfaces. For example, a schema can be created where publishing locations are expressed richly (associated with metadata) to include a structure (e.g., a hierarchical structure) of the published location and logic for how to handle the location with its sub-containers or files therein.

FIG. 1 illustrates one embodiment of an exemplary user interface and control system 100. The user interface system may be used, for example, for creating a work flow for a print job of a document or packaging to be proofed and further processed after approval of the proofing. The user interface, however, is not limited to any specific process or processing device. FIG. 1 illustrates a client device, such as a computer device 102 that comprises a memory 104 for storing instructions to be executed via a processor therein. The system 100 may include an input device 108, a display 110, a user interface 112, and/or a network connection 114.

Content that may be displayed or rendered in the user interface 112 is sent over the network 114. The network 114 may be in the form of an internet connection, some other connection or may be any device for storing and transferring data for supplying content in digital format. The data could be a job request by a client or customer with the content and specifications for the job that may be converted to JDF or some other format language (e.g., XML, or the like), which defines a job ticket for creation of a job request. The request may be for printed documents, packaging items, kitting, or the like to be proofed and sent to production, and/or for maintenance request tickets, for example. The present disclosure is applicable to any context in which breadcrumb pathways are displayed including virtual three dimensional renderings, and is not limited to packaging and workflow request environments, but also includes any environment for supporting the user interface 112.

A central processor 106 having a memory 116, for example, receives a job request and processes it through one or more workstations 118 for rendering content thereon. The content may provide different assets necessary for implementing a job or task. Virtual renderings of the job can be presented in three dimensional virtual scenes via a graphics processing unit (GPU) 120, for example, or a visual processing unit that specializes in offloading and accelerating three dimensional and/or two dimensional graphics rendering from a microprocessor to the workstation 118. In one example, the processor 106 is a networked Document Product Visualization (DPV) processor 106 that operates with software to store JDF data in the memory. The processor 106 is coupled to a breadcrumb view area generator that is configured to generate and provide a breadcrumb view area having a breadcrumb pathway corresponding to various virtual locations (e.g., files, folders, sub-folders, data items, etc.).

The workstation 118 or work order generator that provides a display that renders a virtual rendering of the document, package for the user, or other request in which the user afterwards provides an approval input, or confirmation that the document or package is to the user's satisfaction. The job request or ticket is then updated in memory, for example, and sent down the production chain to an imaging device 122, such as a production printer. The imaging device 122 includes a transfer station 124 that transfers toner to a print medium 128 for a final work product (e.g., a maintenance request, or other document request) to be produced and delivered to a client. The imaging device 122 includes a user interface system 126 with navigation controls therein to open files or folders and drill into respective files, or sub-folders therein by navigating through a pathway, which can be regenerated as a breadcrumb pathway. The user interface system 126 of the imaging device 122, as well as the user interface 112, is adaptable for displaying a breadcrumb view area having at least one breadcrumb pathway including active links to navigational screens that have been drilled through or navigated from with content, such as different data items at respective links. In one example, a user navigates through the system 100 from different folders, files, sub-folders, and/or data items in order to carry out a work order request, job ticket or the like. Within the user interface 112, a breadcrumb pathway associated with this navigation is displayed, which is further illustrated and explained below in conjunction with FIG. 2

Figure 2:
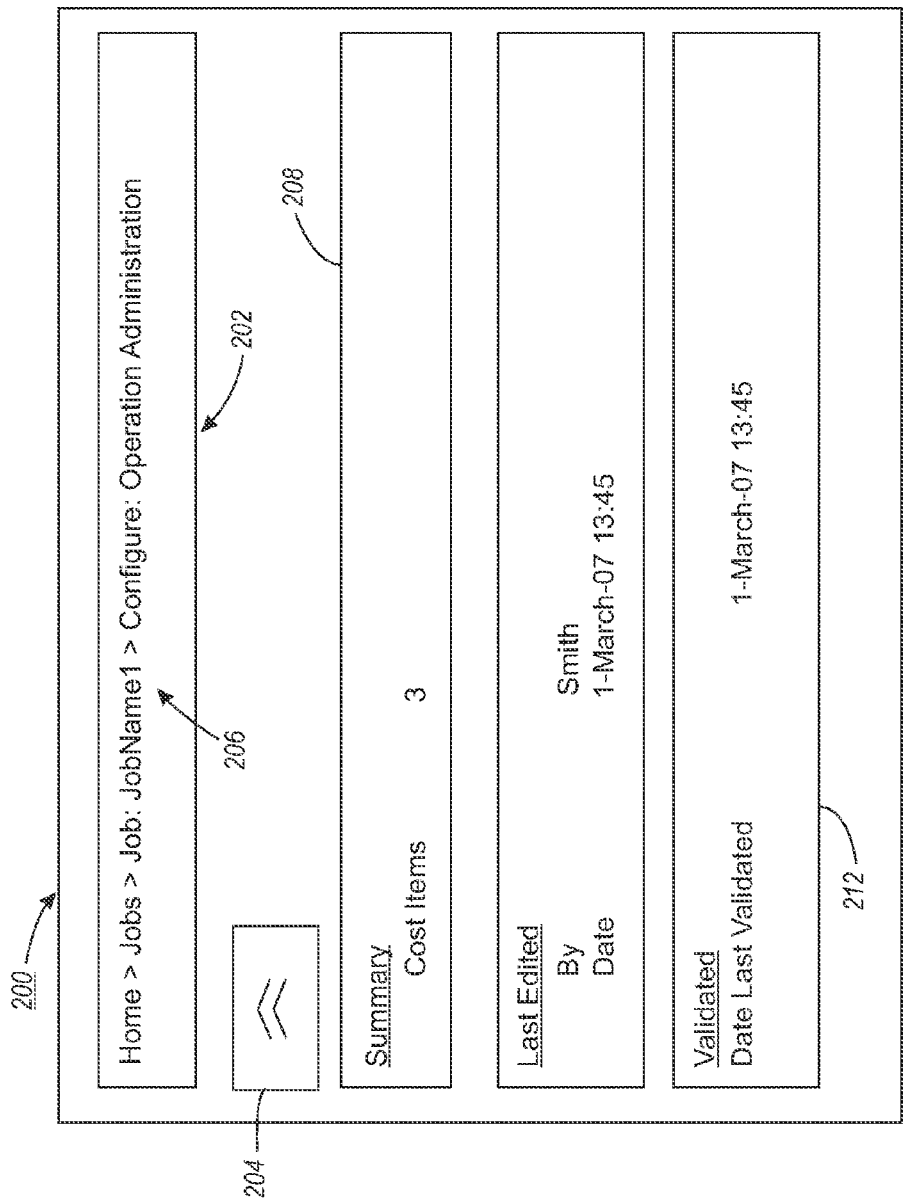
FIG. 2 is one aspect of a user interface according to embodiments herein.

Referring now to FIG. 2, illustrated is an exemplary embodiment of a user interface 200 having a breadcrumb view area 202, which can, for example, be rendered in the workstation 118 in a user interface or with the user interface 112, or 126 of FIG. 1. Any phase of production or in any processing device, such as processor 106 can be used to implement the breadcrumb view area 200. The user interface 200 includes an indicator 204 that signifies that the breadcrumb view area 202 is located within the user interface 200. The indicator 204 has a double arrow symbol pointing to the breadcrumb view area 202, which is viewable to a user of the interface. The indicator 204 may include any symbol to signify the presence of the breadcrumb view area 202, and is not limited to any one symbol in either a three-dimensional virtual interface, two-dimensional interface, or the like. For example, the indicator 204 can include any operator or symbol, such as a picture of an actual bread crumb or bread crust to indicate to the user the presence of the breadcrumb view area 202.

The breadcrumb view area 202 includes a breadcrumb pathway 206 illustrating a path that is navigated through to the presently displayed folder, file, container, sub-files, data items, or the like. For example, starting at a home page of a web site or other folder, a user has navigated to a file that is titled "Jobs." Following the Jobs folder location, is a "Job: JobName1" location, which is followed by the location titled "Configure: Operation Administration." Each location may be a compartment, file, folder, etc. in which a user has navigated from and is displayed as the breadcrumb pathway 206 in the breadcrumb view area 202, which has active links corresponding to the locations for navigating to from the current location "Configure: Operation Administration." Arrows between each location indicate the sequence of navigation, but any separator symbol may or may not be used.

The currently displayed location in the user interface 200 has content sections 208, 210, and 212 therein and is titled "Configure: Operation Administration." Each content section has content or data therein for display within the user interface 200, and is not limited to the example illustrated in FIG. 2, but may include any number or type of data items or other folders. For example, content section 208 provides for a summary of a job ticket with a number of cost items for the specific job request. Information pertaining to the file or data item and when it was last edited is illustrated in content section 210. The content section 212 provides time stamp information about validated content, for further example.

Figure 3:
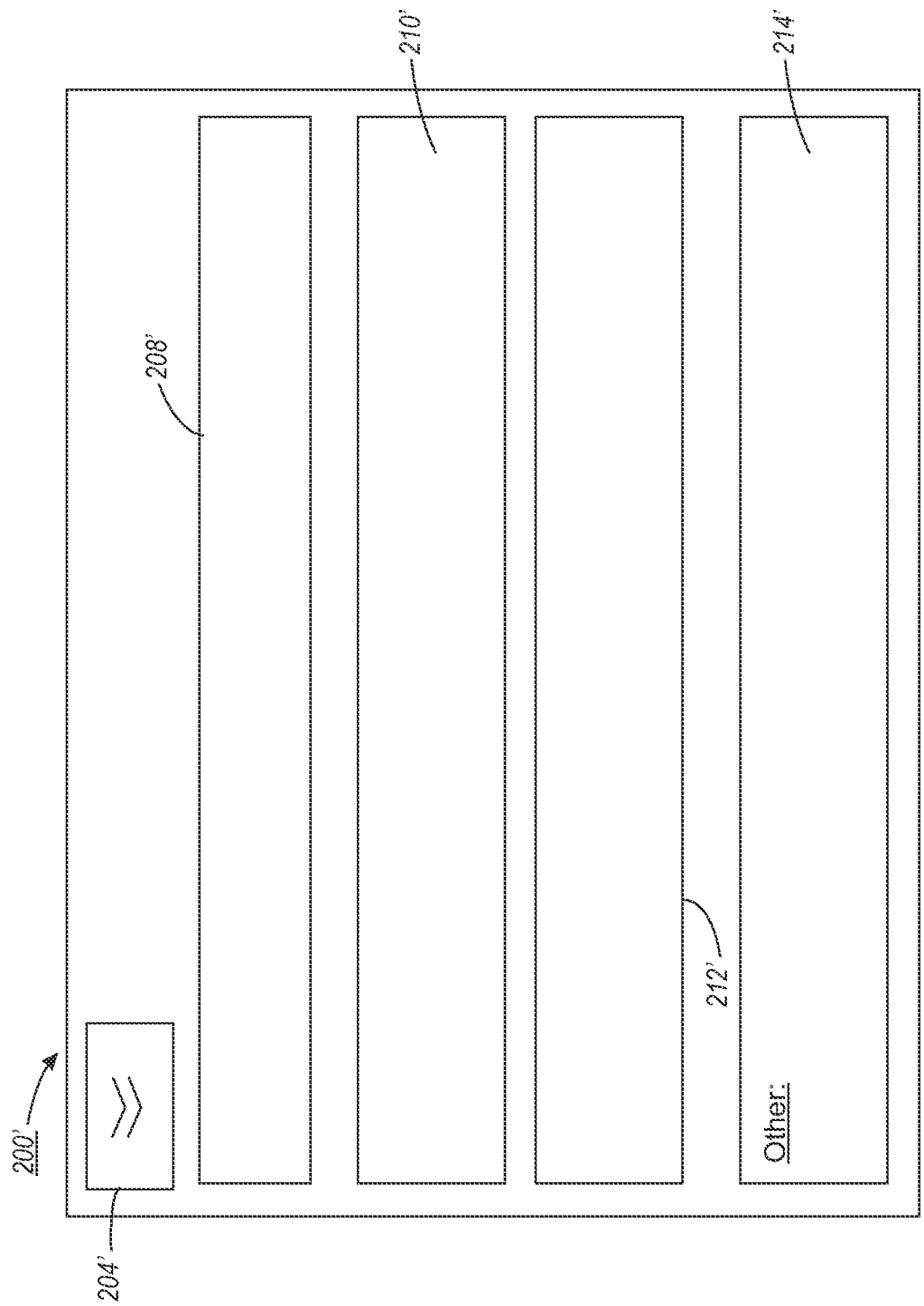
FIG. 3 is another aspect of a user interface according to embodiments herein.

Referring to FIG. 3, illustrated is another example of the user interface 200' where the breadcrumb view area 202 discussed above is hidden from view of the user. The indicator 204' signifies the presence of the breadcrumb view area 202 event though the breadcrumb view area 202 with the breadcrumb pathway 206 is hidden from view of the user. While the content sections 208', 210' and 212' still remain in view, additional space is afforded for sections with other content to be displayed, such as a content section 214 having "Other" information within it. The content section 208', 210', and/or 212' may still have the same information or may have different information if the user has navigated deeper, for example, to a different location (e.g., a different folder). The user interface 200, 200' is not limited to any number of content sections or content, and may have one or more sections having various types content including other folders, links, sub-folders, images, text or the like.

The indicator 204' provides an upside down arrow in contrast to the indicator 204 of FIG. 2. The indicator 204' may use any symbol, operator or information to help signify, in addition to the indicator's presence, a state and/or presence of the breadcrumb view area 202 and/or the breadcrumb pathway.

According to one embodiment, the indicator 204, 204' operates as a control (e.g., an indicator control) that receives input thereat for displaying the breadcrumb view area 202'. For example, upon receiving input from the user, such as a click, keyboard stroke, or touch thereat, the breadcrumb view area 202 is displayed. Upon receiving a second input, the breadcrumb view area 202 may be hidden from view as in FIG. 3. The first and second inputs may also be receiving on the user display presenting the user interface 200, 200'. The first and second inputs may also be received on other sections of the user interface 200, 200' being displayed where the breadcrumb view area 202 is located, such as alongside the indicator 204, 204' or proximate thereto, for example.

In other embodiments, the inputs for hiding and/or concealing the breadcrumb view area 202 is based on inputs received that are independent of the user, such as one or more criteria. For example, when the breadcrumb pathway 206 in the breadcrumb view area 204 becomes too long as a result of title, number of active links have been navigated to, or by another criteria, the breadcrumb view area 202 and breadcrumb pathway 206 may then be hidden from view to allocate more space and not interfere with any other content being displayed. For example, the breadcrumb pathway 206 may be hidden from view as in FIG. 3 when the breadcrumb pathway becomes too long to fit within a single line of text having a set length, and navigation to location with long titles or too many navigational locations may cause the pathway to exceed a length that may be set as the length for a single line of text, or for other set lengths according to a user's preference. In another example, text-wrapping or a text-wrapping condition could be the input for hiding the breadcrumb view area. For example, when the breadcrumb pathway 206 wraps or extends down to a next line of text, the breadcrumb view area 202 becomes hidden from view. In addition, once the pathway shortens to length under the set length, the breadcrumb view 202 is displayed. In other words, the input for displaying the breadcrumb view area 202 can be the length of the breadcrumb pathway 206 at any given time. For example, the active links of the breadcrumb pathway 206 may correspond to opened pop-up windows and as the pop-up windows are closed the breadcrumb pathway 206 shortens. By way of another example, navigating backwards, such as with a back-up control or button could cause the breadcrumb pathway 206 to shorten and fall under the set length for being hidden, and thus, provide the input to bring the breadcrumb view area 202 into view.

Figure 4:
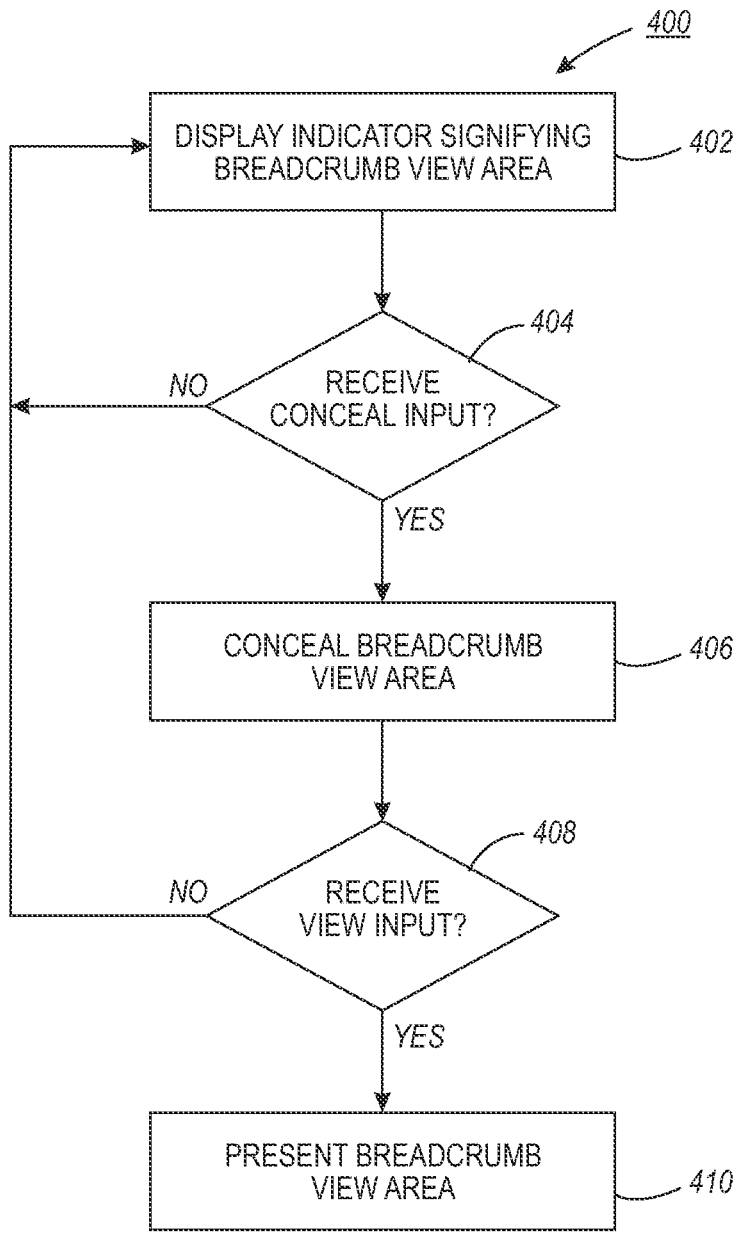
FIG. 4 is a flowchart detailing an exemplary method for a user interface having a breadcrumb view area therein according to another aspect.

An example methodology 400 for minimizing ghosting in an image forming device is illustrated in FIG. 4. While the method 400 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

The method 400 initiates at 402 and displays an indicator 202, 202' that signifies a breadcrumb view area 204 in display having a user interface 200, 200'. The breadcrumb view area 204 can be displayed via different user interface controls, such as by fading, tabbing, pop-up display, drop down menu or by other interactive controls within the user interface. As a user navigates to other links the breadcrumb pathway provided within the user interface expands. Depending upon the length of the title of each link and the number of locations the user navigates to the hierarchical structure of the breadcrumb pathway lengthens. At 404, a question is asked whether the user interface system has received input to conceal the breadcrumb view area 204. When input is not received (NO at 404) the process flow of method 400 is directed to continue displaying the indicator is signifying the breadcrumb area at 402 without further action. When input is received to conceal the breadcrumb area (YES at 404) the process flow of method 400 is directed to 406 where the breadcrumb area 204 is concealed from view of the user.

At 408, the question is asked whether a view input is received. Where no input is received (NO at 408), the process flows to 402 where the indicator 202, 202' is displayed. When input that causes the breadcrumb area to come into view is received, the process flows to 410 where the breadcrumb view area is presented.

In certain embodiments, the breadcrumb pathway 206 may or may not exceed a length of the user display approximate to a set length for a line of text at any given time. Not exceeding a certain length, for example, can provide a first input or a view input that is at the indicator on the display to display the breadcrumb view area. For example, where the breadcrumb pathway is less than a line length, no text-wrapping occurs or is sensed, and/or a pathway is deleted to fit onto one line, can each provide input in the user interface to display the breadcrumb view area 204. A second different input, or a conceal input is received to conceal the breadcrumb pathway. For example, the second input includes the breadcrumb pathway exceeding a length of the user display approximate to a set length for at least one line of text, or some other predetermined length that may or may not be controlled by a user. Alternatively, another criteria being met may be used as a hide input. For example, a user request in the form of clicking at a location on the indicator or other keyboard stroke or touch screen input thereat that is performed by a user or user interface control. In one embodiment, the hide input may be provided proximate to the indicator or where the breadcrumb view area 204 would be located in the user's view at different location of the display or user interface other than the indicator control itself.

The indicator signifying the breadcrumb view area 202, 202' is rendered via the user interface concurrently with content displayed in a current folder or file that the user has opened or navigated to. The content and indicator, for example, are displayed on the same screen display or at the same time. An advantage of the methods described herein is that space is saved and utilized efficiently for a user friendly interface. The user interfaces described herein can be for presenting a finalized workflow request to the user, where upon retrieving a final approval input after visual inspection by the user, a work order request output is generated in order to implement the transfer station to transfer toner to paper or other medium. Various implementations are envisioned as one of ordinary skill in the art will appreciate.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is, in turn, capable of implementing the flowchart shown herein.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for a user interface system in an imaging device system to enable a breadcrumb pathway in a user display executed via a processor with a memory storing executable instructions having the method, comprising:
providing a work order request output based on images associated with content of at least one active link of the breadcrumb pathway, wherein receiving a first input includes receiving a user input at an area of the user display proximate to an indicator for displaying a breadcrumb view area via a touch screen control or an external device;
displaying the indicator that signifies a breadcrumb view area that is hidden from view of a user within the user display by the processor in the imaging device system;
upon receiving the first input at the user display, presenting the breadcrumb view area in the user display and a breadcrumb pathway therein, the breadcrumb pathway exceeding a length of the user display approximate to a set length for at least one line of text;
upon receiving a second input, concealing the breadcrumb view and the breadcrumb pathway from the view of the user within the user display; and
wherein the breadcrumb pathway includes one or more active links in a hierarchical structure to content navigated by the processor.

2. The method of claim 1, wherein receiving the first input comprises:
receiving the first input located at the indicator to display the breadcrumb view area.

3. The method of claim 1, wherein the breadcrumb pathway includes displaying one or more links for a folder and one or more subfolders within the folder.

4. The method of claim 1, rendering a recent content in a content view of the user display by the processor concurrently with displaying the indicator and associated with a last link of the breadcrumb pathway.

5. The method of claim 4, wherein rendering the recent content comprises:
presenting a finalized workflow request to the user; and
retrieving a final approval input after visual inspection by the user and generating a work order request output.

6. The method of claim 1, displaying a perspective view of a virtual scene in the user display with the indicator located among virtual data objects, and having a three dimensional operator symbol thereat to signify the breadcrumb view area that is hidden from view in the user display.

7. A method for a user interface system of a computer to enable a breadcrumb pathway in a user display executed via a processor with a memory storing executable instructions having the method, comprising:
receiving one or more inputs at the user interface system to hide a breadcrumb view area having a breadcrumb pathway in the user display;
displaying an indicator control of the user interface system that signifies a breadcrumb view area that is hidden from view of a user within the user display by the processor; and
upon receiving one or more second inputs at the user display, presenting the breadcrumb view area in the user display and a breadcrumb pathway therein;
wherein the breadcrumb pathway includes one or more active links in a hierarchical structure to content navigated from by the processor; and,
wherein the breadcrumb area is displayed in the user display when the second inputs received include a user view request via the user interface system at the indicator control, and/or deletion of content associated with one or more active links that shortens the breadcrumb pathway to be less than a line length set for the user display.

8. The method of claim 7, wherein the one or more inputs include a text-wrapping generation of the breadcrumb pathway, a user request at the user interface, and the breadcrumb pathway exceeding a line length set for the user display.

9. The method of claim 7, wherein receiving the one or more second inputs includes receiving a touch screen input by the user at the indicator control.

10. The method of claim 7, wherein receiving the one or more second inputs includes receiving at least one of a user view request via the user interface system at the breadcrumb pathway area, and/or deletion of content associated with one or more active links that shortens the breadcrumb pathway to be less than a line length set for the user display.

11. A non-transitory computer readable medium comprising computer executable instructions for executing the method of claim 7.

12. An imaging device system with a user interface to generate a display view in response to a content request, comprising:
a memory coupled to a processor of the imaging device;
a display configured to display a content view navigated to by a user;
a breadcrumb view area generator that provides a breadcrumb area view with a breadcrumb pathway including one or more active links associated with content of paths navigated from by the user;
and,
an indicator control that displays and hides the breadcrumb view area and the breadcrumb pathway based on at least one criteria in response to user inputs including a user view request via the user interface and/or deletion of content associated with the one or more action links that shortens the breadcrumb pathway to be less than a line length set for the display.

13. The system of claim 12, wherein the criteria includes a length of the breadcrumb pathway, a length of one line of text within the user display, and/or text-wrapping of the breadcrumb pathway.

14. The system of claim 12, wherein each path includes one or more folders and/or subfolders.

15. The system of claim 12, wherein the content includes assets associated with work order requests for generating at least one print job on the print medium.

* * * * *